Patented June 17, 1941

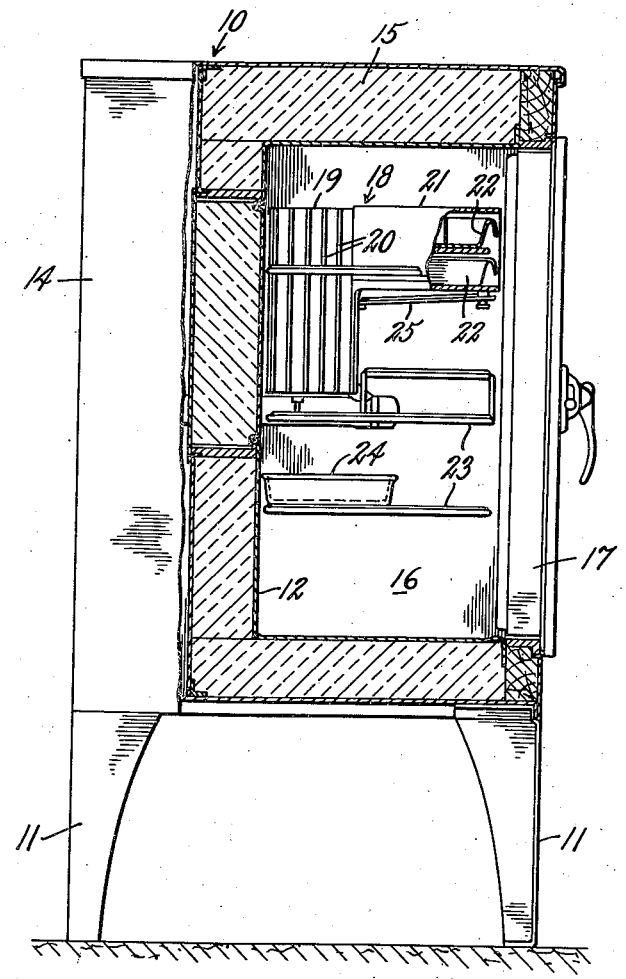

2,245,737

UNITED STATES PATENT OFFICE 2,245,737

REFRIGERATION

John Gudbrand Tandberg and Carl Damsberg, Stockholm, Sweden, assignors, by mesne assignments, to Servel, Inc., New York, N. Y., a corporation of Delaware Application March 14, 1938, Serial No. 195,716
In Germany March 17, 1937

3 Claims. (Cl. 62—1).

This invention relates to refrigeration, and has for its object to provide an improvement for sterilizing water and other liquids in a food storage space of a refrigerator, as will appear from the following description and accompanying drawing in which the figure diagrammatically illustrates an embodiment of the invention.

Referring to the drawing, the refrigerator embodying the invention comprises a cabinet 10 having supporting legs 11. The cabinet 10 includes an inner metal shell or liner 12 arranged within an outer shell 14 and insulated therefrom with any suitable insulating material 15. The inner shell 12 defines a thermally insulated storage space 16 into which access is afforded by a door 17.

A cooling element or evaporator 18 of a refrigeration system is disposed in storage space 16. The cooling element 18 may include a portion 19 having fins 20 and which is employed for cooling space 16, and a portion 21 which is employed as a freezing unit. The portion 21 is in the form of a shell having compartments to receive trays 22 adapted to contain water or other matter to be frozen.

The storage space 16 is provided with a plurality of spaced shelves 23 which are supported within liner 12 in any suitable manner. On one of the shelves 23 is supported a defrosting or drip tray 24. The tray 24 is provided to collect water resulting from melting of frost when cooling element 18 is defrosted, such frost accumulating on the cooling element during operation of the refrigeration system. Below the freezing portion 21 of the cooling element is provided a baffle plate 25 for conducting melted frost from the freezing portion to a region above defrosting tray 24.

In accordance with this invention, in order to sterilize water within storage space 16 and to prevent the growth of bacteria and micro-organisms which may be present, the surfaces which come in contact with water are coated with a suitable sterilizing substance. Any dust and other foreign particles in air, which settle and accumulate in the water, may contain bacteria and micro-organisms. By sterilizing the water, the growth of bacteria and micro-organisms is suppressed and the likelihood of infecting food with bacteria is avoided.

It is particularly desirable to provide the baffle plate 25 and defrosting or drip tray 24 with a coating of a sterilizing substance inasmuch as the surfaces of these parts come in contact with and are wetted by water resulting from melting of frost which accumulates on cooling element 18. The inner liner 12 may also be coated with the sterilizing substance since water vapor from air may condense upon the surfaces of the liner. This is due to the relatively low temperature of the liner surfaces which may be at a value below the dew-point temperature of air in storage space 16. By providing all of the surfaces which become wetted with a coating of the sterilizing substance, the more effectively will air in the storage space be maintained free of any bacteria.

When the space cooling portion 19 of cooling element 18 is operated above the freezing temperature and at a value below the dew-point temperature, condensation of water vapor from air will occur on the surfaces of the space cooling portion 19. Under such conditions it will be desirable to coat space cooling portion 19 and fins 20 with the sterilizing substance. The ice trays may also be provided with a coating of the sterilizing substance to insure sterilization of water contained therein.

Among the sterilizing substances which may be employed to effect sterilization of water, silver is particularly good since it possesses a high sterilizing effect. The surfaces which will be wetted may be coated with a finely divided silver of the type known as Katadyn silver. The metallic character of silver and its complete freedom from any toxic action on human beings makes this substance particularly suitable for coating the walls of storage space 16 and the surfaces of parts therein.

The adhesive property and the hardness of the surface provided by Katadyn silver is particularly desirable for use as a sterilizing substance. In the event that the defrosting tray, ice trays, and other parts are formed of aluminum, the aluminum surfaces may be provided with a silver coating in connection with the electrolytic oxidation of the surfaces. The electrolytic oxidation of the aluminum surfaces to resist corrosion may be effected in such a manner that silver grains or a thin plating of silver is precipitated on the oxide film and carried by the latter.

While silver has been mentioned as one suitable substance which may be employed as a sterilizing material, any non-toxic and odorless substance may be employed which will adhere to the surfaces of the storage space and parts therein. In addition to providing a protective coating of a sterilizing substance on the surfaces of the usual parts and accessories found in a household refrigerator, the surfaces of vessels and trays which contain food and other liquids and which are stored in the storage space may also be provided with such a protective coating.

What is claimed is:

1. A refrigerator having a food storage compartment formed by thermally insulating walls, refrigeration apparatus including a cooling element having surfaces for cooling air in said compartment, means for conducting condensed moisture from said cooling element surfaces to disposal, and finely divided silver located so as to be contacted by said condensed moisture to render and keep the latter sterile while in said food storage compartment.

2. A refrigerator as set forth in claim 1 in which said refrigeration apparatus is operated so that said air cooled surfaces are at a temperature above the freezing point of water, and said silver is located on said surfaces.

3. A refrigerator having a thermally insulated compartment, water bearing surfaces in said compartment, refrigeration apparatus for cooling said surfaces, said surfaces being formed by aluminum having an oxide coating produced by electrolytic treatment of the aluminum, and finely divided silver mixed with or deposited on the oxide.

JOHN GUDBRAND TANDBERG.
CARL DAMSBERG.